US008033678B2

(12) United States Patent
Patterson

(10) Patent No.: US 8,033,678 B2
(45) Date of Patent: Oct. 11, 2011

(54) SCREW ON LIGHTED END ATTACHMENT FOR USE WITH A FLEXIBLE SNAKE

(76) Inventor: Jason Patterson, Rochester Hills, MI (US)

( * ) Notice: Subject to any disclaimer, the term of this patent is extended or adjusted under 35 U.S.C. 154(b) by 360 days.

(21) Appl. No.: 12/423,043

(22) Filed: Apr. 14, 2009

(65) Prior Publication Data

US 2009/0257221 A1 Oct. 15, 2009

Related U.S. Application Data

(60) Provisional application No. 61/044,736, filed on Apr. 14, 2008.

(51) Int. Cl.
*B25B 23/18* (2006.01)
(52) U.S. Cl. ........ 362/120; 362/191; 362/391; 362/800; 254/134.3 FT
(58) Field of Classification Search .......... 362/119–120, 362/190–191, 391, 800; 254/134.3 FT
See application file for complete search history.

(56) References Cited

U.S. PATENT DOCUMENTS

| 5,820,249 | A | 10/1998 | Walsten et al. |
| 6,972,377 | B2 | 12/2005 | Sawyer et al. |
| 7,025,333 | B1 | 4/2006 | Gianturco |
| 2007/0117437 | A1 | 5/2007 | Boehnlein et al. |
| 2008/0026647 | A1 | 1/2008 | Boehnlein et al. |

*Primary Examiner* — Jason Moon Han
(74) *Attorney, Agent, or Firm* — Gifford, Krass, Sprinkle, Anderson & Citkowski, P.C.

(57) ABSTRACT

The present invention discloses a screw on lighted attachment for use with a fish wire, and which includes a conical body constructed of a durable and selectively transparent material, this further being adapted to being mounted to a remote end of the fish wire. A tip location of the body is configured with an eyelet portion formed there-through, and to which an end of a second retrieval wire is secured. An illuminating element, such as a light emitting diode, is housed within the body with a power source incorporated into the body and communicating with the LED element for activating the same to illuminate an area surrounding an inserted location associated within the body.

12 Claims, 1 Drawing Sheet

U.S. Patent    Oct. 11, 2011    US 8,033,678 B2
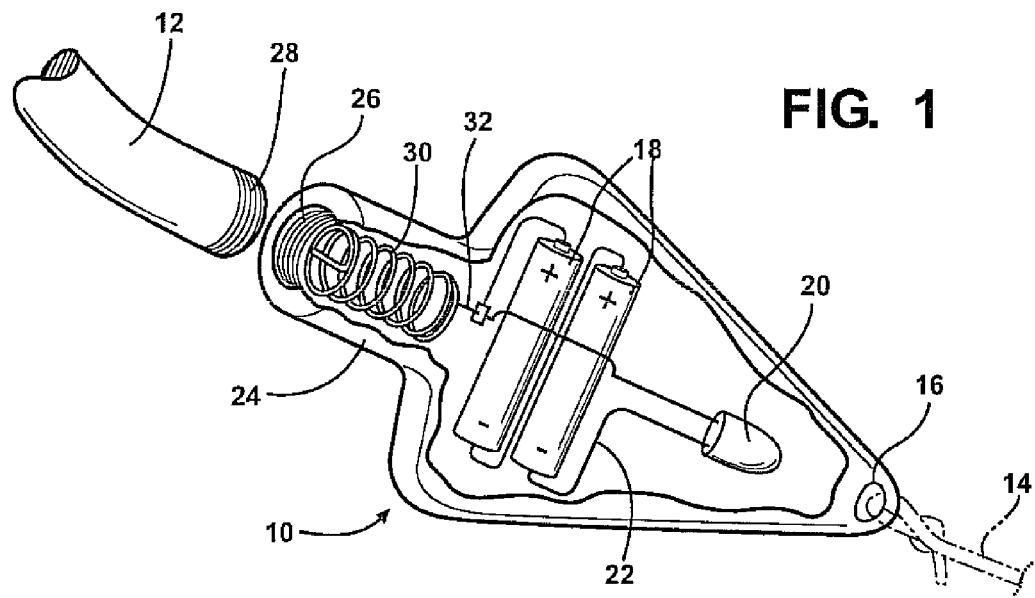
FIG. 1
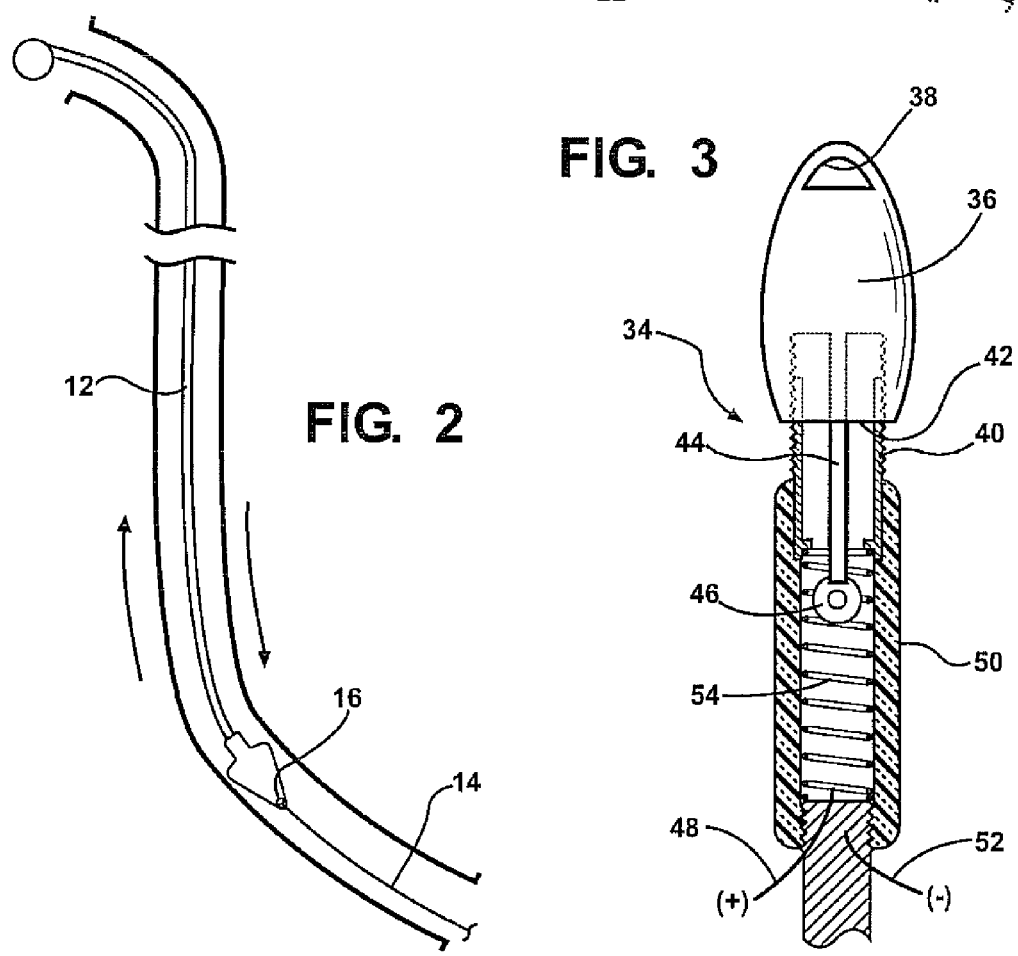
FIG. 2
FIG. 3

SCREW ON LIGHTED END ATTACHMENT FOR USE WITH A FLEXIBLE SNAKE

CROSS-REFERENCE TO RELATED APPLICATIONS

This Application is a Non-Prov of Prov (35 USC 119(e)) application 61/044,736 filed on Apr. 14, 2008 SCREW ON LIGHTED END ATTACHMENT FOR USE WITH A FLEXIBLE SNAKE WIRE.

FIELD OF THE INVENTION

The present invention relates generally to snake wire assemblies inserted through such as darkened and enclosed spaces. More specifically, the present invention discloses a screw on LED lighted end attachment for use with a fish wire and which exhibits the properties of impact resistance along with a high degree of illumination. The screw on attachment can be quickly and effortlessly translated through a remote opening, at which a wire is tied or otherwise clipped to a tip positioned aperture, and the fish wire with secured attachment is retreated with the secured wire to the initial remote insertion location

BACKGROUND OF THE INVENTION

The prior art is well documented with examples of fish hook or tape extension/retrieval devices. One objective of such devices is in the location or a fish tape or line, such as is utilized by electrical contractors when working in tight confines or spaces and in order to ran electrical lines.

Known examples include the apparatus and method for locating a fish tape as set forth in U.S. Pat. No. 5,820,249, to Walsten. The locator exhibits a first threaded end for fixing to the end of a fish tape and an opposite second end with emits light to help locate the end of the fish tape when it is being fished through a blind space. The first end is provided with a cross-bore for connecting the locator to a string, chain, hook or other line.

U.S. Pat. No. 7,025,333, issued to Gianturco, teaches a visual navigation device including a reel mounted within a reel housing. A flexible tape wound on the reel is adapted to be payed out of the housing and into an area to be navigated. A distal end of the flexible tape incorporates a video camera, a visual monitor being operatively connected to the camera and supported in the reel housing.

Other examples include U.S. Pat. No. 6,972,377, to Sawyer, and which discloses a glow rod assembly for guiding, feeding or routing a wire or cable in a target space of an existing structure. The elongate (typically glowing) rod includes first and second opposite end portions, an anchoring member attached to the rod first end portion. The anchoring member resides against a surface of a structural frame member to hold the first end portion outside of a target internal routing space to allow the second end portion to extend in the to the target internal routing space, thereby allowing one end of the rod to remain in a fixed location without requiring a second installer.

SUMMARY OF THE INVENTION

The present invention discloses a screw on lighted attachment for use with a fish wire, and which includes a conical body constructed of a durable and selectively transparent material, this further being adapted to being mounted to a remote end of the fish wire. A tip location of the body is configured with an eyelet portion formed there-through and to which an end of a second retrieval wire is secured. An illuminating element housed within the body is activated to illuminate an area surrounding an inserted location associated with the body.

Additional features includes the illuminating element further exhibiting an LED element and with a power source incorporated into the body and communicating with the LED element. Also, a spring element may be annularly seated within an attachmnent end of the body and is compressed from an open to a closed circuit configuration, this upon screwing the attachment onto the fish wire and in order to communicate at least one interiorly secured battery to the LED element. The fish wire may also include a flexible fiberglass rod exhibiting a threaded end, and to which is engaged the attachment end of the body.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an illustration of the screw on lighted attachment according to a preferred embodiment of the present invention;

FIG. 2 is an environmental view of the lighted attachment and associated flex stem (fish wire) being fed in successively first and second opposite linear directions for remote acquisition and subsequent retrieval of a wire; and FIG. 3 is an illustration of an alternately configured lighted attachment.

DETAILED DESCRIPTION OF THE PREFERRED EMBODIMENTS

Referring now to FIG. 1, an illustration is generally shown at 10 of a screw on lighted attachment according to a preferred embodiment of the present invention. As previously described, the attachment 10 is utilized for translating through a confined space from such as a remote location. As previously described, the present invention discloses a screw on LED (light emitting diode) lighted end attachment for use with an elongated and flexible element 12, this including any of a durable and flexible wire or rod. In the case of a flexible rod, the elongated element can be constructed from. such as a flex stem fiberglass or other suitable material.

The attachment 10 exhibits a generally conical or arrow three dimensional shaped body, an outer shell portion of which exhibits the properties of impact resistance and, along with a high degree of illumination, can be quickly and effortlessly translated through a remote opening, such at which a further remote wire 14 (such as an electrical wire as shown in FIGS. 1 and 2) is tied or otherwise clipped to a tip positioned aperture, whereupon the flexible element 12 with secured attachment is retreated with the secured wire to the initial remote insertion location.

As again shown in FIG. 1, the attachment 10 is constructed of a durable plasticized and, in one variant, transparent material. A tip location of the attachment is further configured with an eyelet portion formed therethrough, see at 16, and to which the remote end of the retrieval wire 14 can be clipped, knotted or otherwise secured. It is also envisioned and understood that the eyelet portion can be reconfigured so as to be externally fastened to the pointed end of the attachment, as well as integrally formed therewith as shown.

An interior spaced associated with the conical shaped body includes an interior battery compartment, in the illustrated embodiment including a pair of AA or AAA batteries, see as shown at 18 in FIG. 1. It is also envisioned that other portable battery sources, such as lithium diode (e.g. watch type) or other batteries can be substituted for the alkaline type batteries shown, and which can also provide the necessary size, weight and power output characteristics.

An LED (light emitting diode) is illustrated at 20 within the transparent casing of the attachment body 10 and is provided for emitting a focused and relatively high powered degree of luminescence (illumination) focused in a direction towards me tip configured wire retrieval eyelet 16. The use of LED lighting, as opposed to incandescent or other lighting elements, is preferred as it provides the desired features of small size, light weight, small power drain, and significantly greater impact resistance.

While a white light is preferred, it is also envisioned that LED bulbs emitting other lights, such as red, can be substituted in other desired operating environments. Although not shown, the scope of the present invention can also contemplate the implementation of other illuminating elements, these potentially including any of incandescent, chemical/laser generating light sources, phosphorescent glow in me dark light sources, and the like.

Referring again to FIG. 1, a communication wire 22 extends inside the attachment body and between the generally forward located LED and a base attaching location 24 formed (such as integrally but also separately assembled) with the body. In a preferred embodiment, an open interior end face 26 associated with the base 24 exhibits an annular and interiorly threaded pattern or configuration, this for permitting the attachment body 10 to be rotatably and threadably engaged to a likewise exteriorly threaded portion end portion, see at 28, associated the flexible rod 12 previously identified.

Activation of the lighted end attachment 10 is caused by the progressing screwing engagement of the opposing sets threads, associated with the inserting end of the elongated and flexible rod 12 and the interior end face 26 of the base 24. A compressing motion established by the threaded rotating engaging end of the flexible support rod 12 is transferred to an electrically conductive spring element 30, this incorporated into the base location 24 of the attachment 10 as further shown in FIG. 1. The attachment 10, as shown in operational fashion in FIG. 2, is then capable of being successively inserted and, upon reaching a desired end location, retrieved with a wire 14 secured (at the end location) through the defined eyelet 16.

Upon the spring elements 30 (e.g. this including such as a coiled spring element annularly seated within the interior of the base 24 as well as other potential biasing structure for creating a closed circuit) being compressed from an open to a closed circuit configuration, a further communication line 32 extends from the spring element 30 to the batteries 18 and, in this fashion, communicates power from the batteries 18 and to the LED 20 (or other suitable lighting element) via the further interior communication wire 22.

In this fashion, no ON/OFF switch is required (although one can be provided in a further modified version of the invention), the LED being activated automatically upon screwing on the attachment and subsequently deactivated by likewise unscrewing removal. Additional variants also envision the power source being remotely located and communicated to the attachment, such as through an wire defined inside of the flexible rod 12.

The above said, it is again contemplated that additional variants of the design can contemplate the provision of an ON/OFF switch with suitably modified wiring to the batteries and LED element. The provision of the interengaging screw threads can also be substituted by such as a bayonet tab (compression and twist-lock) configuration (not shown) and which can be established between the flexible rod 12 and the base attachment location, this for creating the necessary closed circuit for communicating power to the LED element. Such a configuration would envision some mirror reconfiguration of the engaging locations, and such as to incorporate such known alternative structure into a suitable and effective engagement scenario.

Referring finally to FIG. 3, an illustration is shown at 34 of an alternately configured lighted attachment according to a further non-limiting preferred embodiment. In this variant, a screw on transparent body is shown at 36 and again includes a tip proximate located eyelet 38 to which is engaged the retrieval wire (not shown). Not evident in FIG. 3 are the inter-engaging pluralities of threads established between the interior of the body 36 and an associated exterior of an inner member 40 (reference further being made to annular configured attachment location 42).

The configuration of FIG. 3 contemplates the member 40 being secured to an end of the rod or like element (see again at 12). Progressive screw engagement of the attachment body 36 results in the downwardly displacement of an inner displacement member, see at 44, extending from the body 36 and into a base component 40. The displacement member 44 can include either a spring-like or a stem-like construction, and to an end of which is mounted a suitable LED element 46, such as in turn mounted within an inner core associated with the base component 40.

The inner core can exhibit such as a positive contact location (see as referenced at 48), whereas an outer body 50 is displaceable or translatable secured over the inner member 40 can exhibit a negative contact location (see as further representatively identified at 52). It is further envisioned and understood that, in addition to the light from the LED being evident through the transparent and end mounted body 36, the base component 40 and outer body 50 can also be constructed to be transparent or opaque to some degree, this permitting the illumination of the LED to be readily visible to the observer.

A coil shaped spring, see as shown at 54, is coaxially sandwiched between the base component 40 and the outer body 50, and can facilitate a compressive bias established between the outer and inner translating components, such as which occurs upon the displacement of the body 36 and associated stem 44, this in turn being configured by an appropriate linkage to cause the inner and outer elements to displace against one another and in opposition to the force of the spring 54. In similar fashion to the closed circuit disclosed in the embodiment of FIG. 1, the variant 34 operates by compression and in order to communicate a power source (not shown in FIG. 3) with the LED 46 element (upon the contact locations 48 and 52 meeting) to illuminate the dark spaces or confines associated with the inserted attachment. It is also further noted that the arrangement of FIG. 3 discloses only one additional possible redesign of the present invention, this operating off of the principle of utilizing a suitable spring or biasing element to cause contact closure between positive and negative leads and in order to communicate a power supply to an appropriate illuminating element.

Having described in invention, other and additional preferred embodiments will become apparent to those skilled in the art to which it pertains, and without deviating from the scope of the appended claims:

I claim:

1. A screw on lighted attachment for use with a fish wire, comprising:

a conical body constructed of a durable and selectively transparent material, said body being screwably mounted to a remote end of the fish wire and incorporating a spring element;

a tip location of said body being configured with an eyelet portion formed therethrough and to which an end of a second retrieval wire is secured; and an illuminating element housed within said body and activated to illuminate an area surrounding an inserted location associated with the body.

2. The attachment as described in claim 1, said illuminating element further comprising an LED element.

3. The attachment as described in claim 2, further comprising a power source incorporated into said body and communicating with said LED element.

4. The attachment as described in claim 3, further comprising the spring element annularly seated within an attachment end of said body and being compressed from an open to a closed circuit configuration, upon screwing said attachment onto the fish wire, in order to communicate at least one battery to the LED element.

5. The attachment as described in claim 4, the fish wire including a flexible fiberglass rod exhibiting a threaded end to which is engaged said attachment end of said body.

6. A screw on lighted attachment for translating through a confined space from a remote location, comprising:

a three dimensional shaped body constructed of a durable and selectively transparent material, said body being screwably mounted to a remote end of an elongated and flexible fish wire and incorporating a spring element;

a tip location of said body being configured with an eyelet portion formed therethrough and to which an end of a second retrieval wire is secured; and an illuminating element housed within said body and activated to illuminate an area surrounding an inserted location associated with the body.

7. The attachment as described in claim 6, said illuminating element further comprising an LED element.

8. The attachment as described in claim 7, further comprising a power source incorporated into said body and communicating with said LED element.

9. The attachment as described in claim 8, further comprising the spring element annularly seated within an attachment end of said body and being compressed from an open to a closed circuit configuration, upon screwing said attachment onto said elongated and flexible fish wire, in order to communicate at least one battery to the LED element.

10. The attachment as described in claim 9, said elongated element further comprising a flexible fiberglass rod exhibiting a threaded end to which is engaged said attachment end of said body.

11. The attachment as described in claim 6, said body further comprising an inner member, an outer member, and the spring element coaxially interposed therebetween.

12. The attachment as described in claim 11, further comprising an inner translating stem extending from within said body to a contact location associated with a selected one of said inner and outer members and, upon being compressed from and open to a closed circuit configuration established between first and second contact locations associated with said inner and outer body, communicating a power source to the illuminating element.

* * * * *

UNITED STATES PATENT AND TRADEMARK OFFICE
CERTIFICATE OF CORRECTION

| | | |
|---|---|---|
| PATENT NO. | : 8,033,678 B2 | Page 1 of 1 |
| APPLICATION NO. | : 12/423043 | |
| DATED | : October 11, 2011 | |
| INVENTOR(S) | : Jason Patterson | |

It is certified that error appears in the above-identified patent and that said Letters Patent is hereby corrected as shown below:

At column 1, line number 32 delete "ran" insert --run--.

At column 2, line number 45 after from delete ".".

At column 3, line number 11 delete "me" insert --the--.

At column 3, line number 22 delete "me" insert --the--.

Signed and Sealed this
Sixth Day of November, 2012

David J. Kappos
*Director of the United States Patent and Trademark Office*